United States Patent [19]

Baker et al.

[11] 4,027,310

[45] May 31, 1977

[54] INK JET LINE PRINTER

[75] Inventors: Don L. Baker; Dean William Skinner, both of Binghamton, N.Y.

[73] Assignee: International Business Machines Corporation, Armonk, N.Y.

[22] Filed: Jan. 16, 1976

[21] Appl. No.: 649,958

[52] U.S. Cl. .................................................. 346/75

[51] Int. Cl.² ........................................ G01D 15/16

[58] Field of Search .............................. 346/75, 140

[56] References Cited

UNITED STATES PATENTS

| | | | |
|---|---|---|---|
| 3,925,787 | 12/1975 | Suzuki | 346/75 |
| 3,928,855 | 12/1975 | Helinski et al. | 346/75 X |
| 3,959,797 | 5/1976 | Jensen | 346/75 X |

*Primary Examiner*—Joseph W. Hartary
*Attorney, Agent, or Firm*—John S. Gasper

[57] ABSTRACT

In an ink jet serial printer, a drop collector has horizontal and vertical collector sections or gutters. Unused drops are diverted in the direction of motion during uniform velocity of the ink jet head into the vertical section and into the horizontal section during acceleration/deceleration portions of head motion. A bias potential applied to the vertical drop deflector is removed during acceleration/deceleration to cause unused drops to be directed to the horizontal collector section.

5 Claims, 6 Drawing Figures

INK JET LINE PRINTER

BACKGROUND OF THE INVENTION

1. Field of the Invention

This invention relates to ink jet printers and particularly to an ink jet printer which prints lines of characters or other data patterns on a print medium. While not expressly limited thereto, this invention has particular application to an ink jet printer which uses magnetic ink.

2. Description of the Prior Art

In serial ink jet line printers a print head is moved across a line of a stationary print medium to print characters or other data patterns in the form of a dot matrix. The print head comprises means for propelling a continuous stream of individual ink drops on a fixed trajectory toward the print medium. A first deflection means deflects selected drops not used for printing in a direction parallel to the direction of motion to an ink collector positioned on one side of and closely adjacent to the jet stream. A second deflection means deflects the ink drops transverse to the direction of motion for deposition on the print medium to form characters. In order to obtain uniform character spacing and quality, printing occurs only when the head is moving at substantially uniform velocity. In order to achieve high printing speeds, the print head is rapidly accelerated to the uniform velocity and again rapidly decelerated to a stop. During the acceleration and deceleration phases of motion, the unused drops are being deflected by the first deflection means toward the drop collector. The rapid acceleration and deceleration of the print head presents problems relative to collecting the unused ink drops. Because of the rapid change in velocity of the print head unused drops deflected toward the ink drop collector may miss the collector to become deposited on the print medium or on the support structures, thereby fouling the machine apparatus.

SUMMARY OF THE INVENTION

It is a general object of this invention to provide an ink jet printer capable of printing at high speeds and having improved print quality.

It is a more specific object of this invention to provide an improved means for collecting unused print drops.

It is a further specific object of this invention to provide means for capturing unused ink drops during rapid changes in the velocity of the ink jet head of an ink jet printer.

The above, as well as other objects, are obtained in accordance with this invention by providing a drop collector constructed to have two sections. In the preferred embodiment, the two sections of the drop collector are connected together at right angles to each other. The first section is located to one side of the trajectory of the ink jet stream and extends transverse to the direction of motion of the print head. The second section is located preferably below the first section and extends across the trajectory of the ink jet stream in the direction of motion. The ink collector preferably takes the form of a plate element shaped to have vertical and horizontal flanges tapered to have vertical and horizontal integrated knife edges. The collector plate is mounted on a block having the form of a staircase. The intermediate step of the collector block is provided with a well for receiving collected ink drops. the plate is mounted on the block so that the vertical and horizontal flanges extend over the intermediate step above the well in the collector block.

In accordance with this invention, the deflection means is operated to direct unused drops selectively to the first collector section or the second collector section. During the printing operation, that is when the print head is moving at uniform velocity, the deflection means directs the unused drops to the vertical collector section. During the non-printing phase the deflection means directs unused drops to the horizontal section of the ink collector. Means is provided for determining the occurrence of acceleration or deceleration phase of motion of the print head and generates control signals to the deflection means to effectuate the direction of the unused drops to the horizontal section of the ink collector.

In the preferred embodiment the second deflection means is energized with a raster scanning signal. When the motion determining means senses the motion of the print head to be other than uniform, the raster scan signal is turned off causing the ink drops of the jet stream to be collected by the horizontal collector section.

The foregoing and other objects, features and advantages of the invention will be apparent from the following more particular description of a preferred embodiment of the invention, as illustrated in the accompanying drawing.

DETAILED DESCRIPTION OF THE INVENTION

Figure 1:
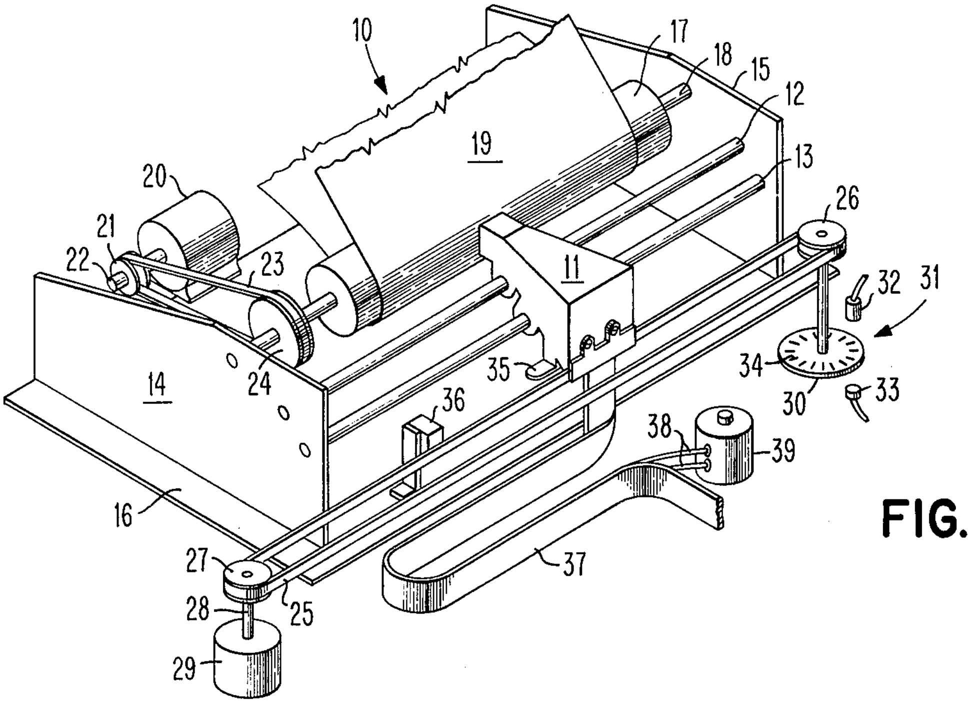
FIG. 1 is an isometric view of a serial ink jet line printer incorporating the features of the invention.

As seen in FIG. 1, a serial line printer 10 comprises ink jet print head assembly 11 journaled to move along rails 12 and 13. The rails 12 and 13 are rigidly fixed to vertical side plates 14 and 15 attached to horizontal baseplate 16. A cylindrical platen 17 has a shaft rotatably supported between the vertical side plates 14 and 15. Platen 17 supports a print medium such as paper 19 in position to have characters recorded thereon in lines of print extending over all or a portion of the width of the paper. A paper feed motor 20 is mounted to base plate 16. A belt 23 connects pulley 21 on shaft 22 of drive motor 20 to pulley 24 on shaft 18 of platen 17. Controls (not shown) operate motor 20 to cause platen 17 to rotate in increments to feed paper 19 one or more lines at a time, as is well known in the art. At the end of printing all or a part of a line of characters by print head 11, motor 20 is activated causing paper 19 to be advanced to the next print line position.

A toothed belt 25 of rubber or similar material is secured to print head assembly 11. Belt 25 passes over idler roller 26 and drive roller 27 at ends of the printer 10. Driver roller 27 is attached to shaft 28 of a stepper motor 29. In the preferred embodiment of the invention motor 29 is a d-c stepper motor of the variable reluctance type energized with a polyphase energization to obtain precise increments of motion of the motor 29 in order to move print head assembly 11 along rails 12 and 13 over a distance corresponding to the print line to be recorded on paper 19. An emitter wheel 30 connected to idler roller 26 is rotated during motion of the print head assembly 11. An emitter sensor 31 comprising a light source 32 and a photocell 33 senses slots 34 or other indicia on emitter wheel 30. The slots 34 are uniformly spaced around wheel 30 so that each slot 34 corresponds with each increment of motion of the print head assembly 11 corresponding to the spacing of the strokes of the dot matrix characters recorded in a line of print. A flag 35 attached to print head assembly 11 operates a home position switch 36 located on base plate 16 at the desired leftmost position of travel of print head assembly 11. Switch 36 can be adjustably mounted on the base plate 16 so that home position can be changed to accommodate various sizes of paper 19. A flexible cable 37 is connected to the print head assembly 11. Cable 37 would include the electrical connections which are connected to the ink jet head elements for the production and control of the ink jet stream and the ink drops thereof. At the free end, cable 37 may be connected to a terminal block or the like for connection to the logic control circuits and external control devices to be described hereinafter. Also included in cable 37 are flexible tubes 38 for conducting the liquid ink from pump 39 to the print head and return.

Figure 2:
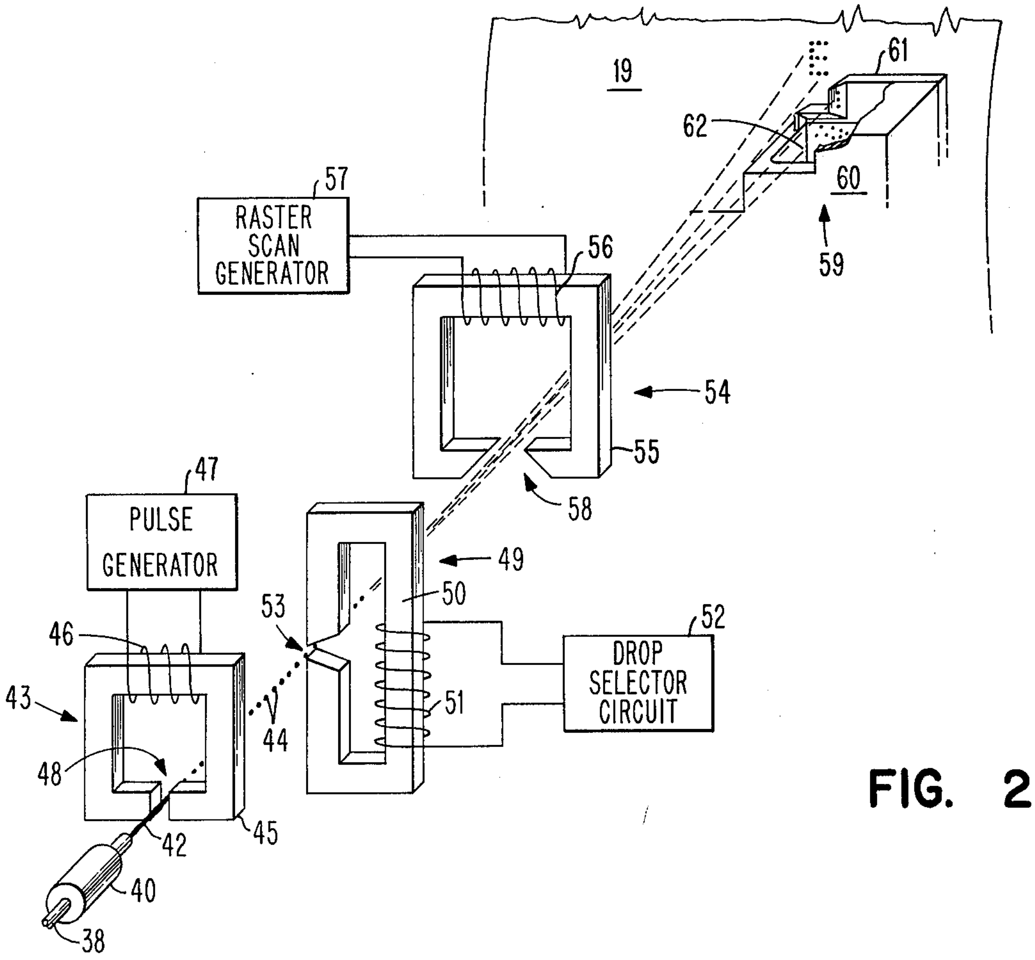
FIG. 2 is an exploded isometric view of the ink jet head portion of the printer of FIG. 1.

As seen in FIG. 2, the ink jet print head comprises a nozzle 40 connected by tube 38 to pump 39. The ink is preferably a ferrofluid of any well-known type. The ink is maintained under pressure by pump 39 (see FIG. 1) in order to project a continuous ink filament 42 toward paper 19. The filament 42 is subjected to a pulsating magnetic field produced by a magnetic exciter 43 to cause the ink filament to break up into individual uniformly-spaced ink drops 44. The magnetic exciter 43 comprises a magnetic core, a winding 46 connected to be energized by an exciter pulse generator 47. The ink filament 42 passes through a uniform gap 48 in the core 45. Pulses supplied at a desired frequency from pulse generator 47 to winding 46 cause the magnetic core 45 to produce a pulsating magnetic field in gap 48 causing the ink filament 42 to experience perturbations in a cyclically recurring manner to produce varicosities ultimately resulting in ink drops 44 to be formed. Core 45 may comprise a single lamination or a plural lamination spaced in relation to the formation of the varicosities. Magnetic exciters of the type described are well-known in the art. While a magnetic exciter is shown as the means for generating ink drops, other drop generators such as the electromechanical transducers can be utilized to produce the desired formation of ink drops. Such transducers are well-known in the art and would utilize piezoelectric or magnetostrictive elements attached to the nozzle 40 which, when energized by a high frequency signal, causes the nozzle to vibrate resulting in the formation of drops.

For printing characters or other data symbols, certain ink drops are not used. The unused drops are selectively deflected from the initial trajectory in a horizontal direction, i.e. parallel to the direction of motion of the print head 10 where they are ultimately intercepted by an ink drop collector 59 located downstream proximate paper 19. Magnetic selector 49 comprises a magnetic core 50 energized by a winding 51 which is connected to a drop selection circuit 52. A tapered gap 53 is formed in magnetic core 50 to produce a non-uniform magnetic field in the vicinity of the gap. In the preferred embodiment of this invention, core 50 is located so that ink drops 44 pass in the vicinity of gap 53 external to core 50. The core 50 has a width substantially less than the wavelength between drops 44. Thus, as winding 51 is pulsed by a data signal from the drop selection circuit 52 in synchronism with the arrival of drops 44 at the gap 53, a deflection force is applied to the drop causing it to be displaced in the horizontal direction.

Downstream from the magnetic selector 49 is a vertical deflector 54. The vertical deflector 54 operates to deflect ink drops 44 transverse to the direction of motion of the print head assembly 10. Vertical deflector 54 comprises a magnetic core 55, and a winding 56 connected to a raster generator 57. Ink drops 44, both used and unused, fly through a tapered gap 58 in the core 55. During the interval the ink drops 44 are within gap 58 they are deflected vertically in accordance with the raster scan signal applied to winding 56. The degree of deflection depends on the time and the shape of the raster signal. In the preferred form in which this invention is practiced the raster scan signal is a sawtooth having a linear ramp although step type raster scan signal could also be used.

As previously mentioned, unused ink drops 44 deflected by selector 49 are prevented from reaching paper 19 by an ink drop collector 59. Drop collector 59 comprises block 60 and collector plate 61. Block 60 preferably takes the form of a staircase having a well 62 formed in the middle step. Well 62 provides a collection chamber with a support plate (not shown) for ink drops 44 intercepted by collector plate 61.

Figure 3:
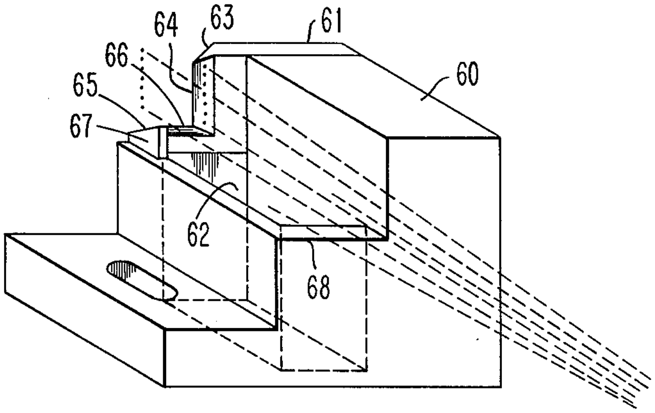
FIG. 3 is an isometric view of the ink drop collector of the ink jet head of FIGS. 1 and 2.
Figure 4:
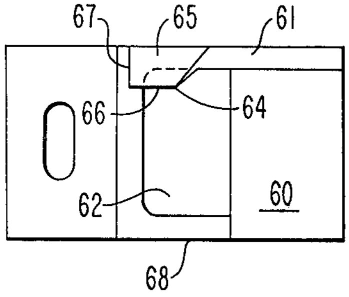
FIG. 4 is a plan view of the drop collector of FIG. 3.

As best seen in FIGS. 3 and 4 collector plate 61 is designed to provide connected vertical and horizontal gutter sections with block 60. For the vertical gutter section collector plate 61 is provided with a vertical flange 63 tapered to terminate in a vertical knife edge 64. For the horizontal gutter collector plate 61 has a horizontal flange 65 tapered to terminate at a horizontal knife edge 66 extending from the base of vertical knife edge 64 to a vertical side wall 67. Collector plate 61 is attached to the rear of block 60 so that the vertical and horizontal knife edges 64 and 66 extend above the well 62 in block 60. The horizontal flange 65 and its knife edge 66 is elevated by the height of side wall 67 above the leading edge 68 of block 60. The interior surface of vertical flange 63 has a laterally directed slope. The interior surface of horizontal flange 65 has a downwardly directed slope. These slopes reduce splashing when drops 44 strike the flanges and encourage ink from unused drops to flow to the vertical and horizontal gutters and to well 62. Because of the slant of the flange surfaces, any spattering caused by ink drops 44 striking collected ink on the flange surfaces would be directed in the direction of the vertical and horizontal gutters and well 62 and away from knife edges 64 and 66.

The drop collector 59 preferably is mounted on a base plate or other means (not shown) which may be part of the print head assembly along with the nozzle 40, exciter selectors 43, 49 and 54. When properly aligned, collector 59 is positioned so that vertical knife edge 64 of the vertical flange 63 is closely adjacent to the initial trajectory of drops propelled from nozzle 40. In the preferred embodiment of this invention the initial trajectory of ink drops 44 is aimed below the horizontal knife edge 66 and above the leading edge 68 of block 60. During the printing portion of the cycle of operation the trajectory of the drops 44 is elevated by energizing winding 56 of selector 54 with a bias current. During the printing portion of the cycle of operation, that is when the print head assembly 10 is moving at uniform velocity, ink drops 44 selected from the stream by selector 49 are deflected to a second trajectory so that the selected drops, i.e. the unused drops, fly toward and into the vertical gutter to the right of vertical knife edge 64 of the vertical flange 63.

As previously stated, this invention provides for means to prevent drops from missing the drop catcher 59 during rapid and abrupt changes in the momentum of the print head before and after the printing portion of the cycle. Basically, this is achieved by controls which determine the velocity condition of the print head assembly as it moves across the print line.

Figure 5:
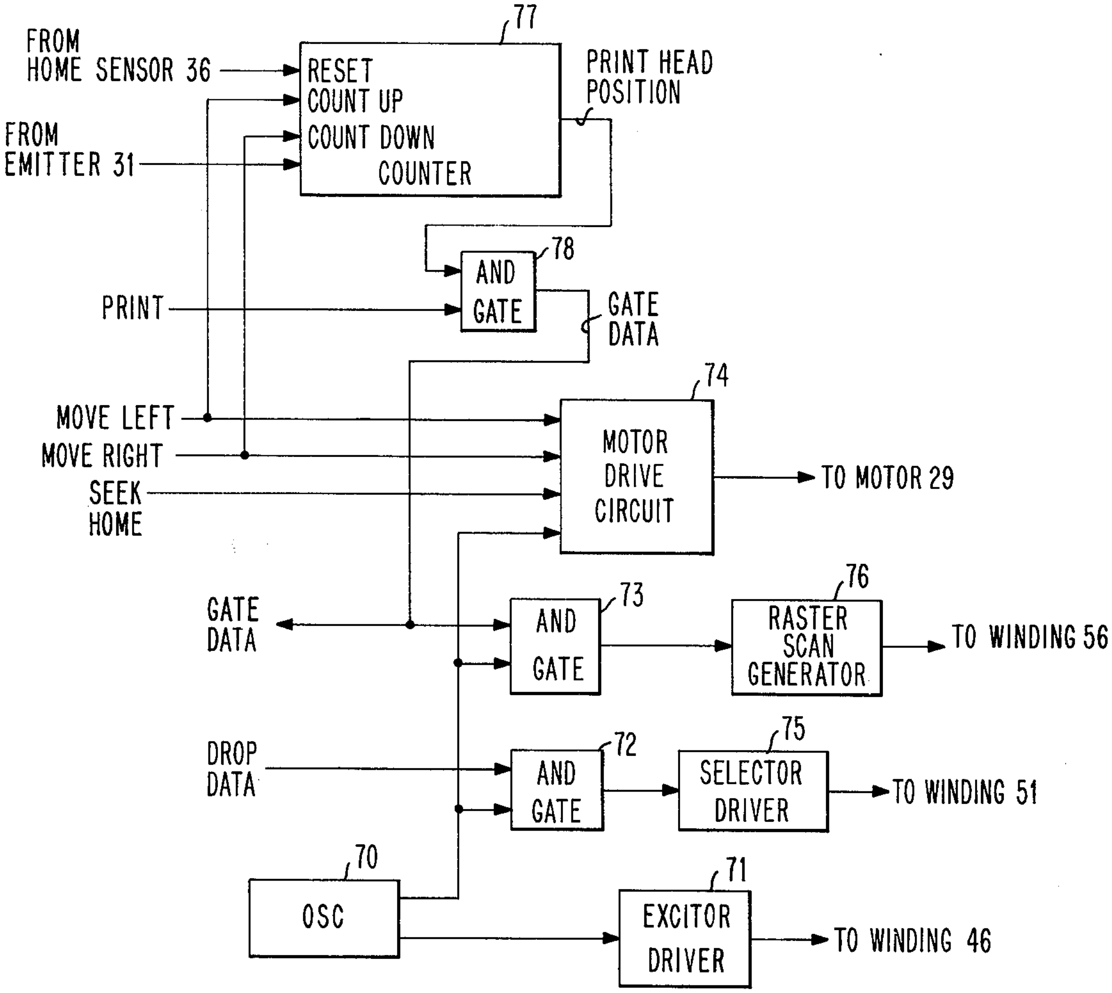
FIG. 5 is a logic circuit diagram of a portion of the controls for the ink jet printer of FIGS. 1 and 2.

A control system, as seen in FIG. 5, provides an oscillator 70 which supplies the basic timing to the system. For this purpose, oscillator 70 has one output connected to an excitor driver 71, which supplies the basic energization pulses to winding 46 of the magnetic excitor 43, as previously described. (In the event an electromechanical drop generator were employed, the pulses from driver 71 would be used to cause the vibrations of nozzle 40.) Oscillator 70 also provides pulsing for timing the selection of unused drops both into the vertical and horizontal gutter sections of collector 59 and to time the driving of the stepper motor 29. For these purposes, a second output from oscillator 70 is connected to AND gates 72, 73 and motor drive circuit 74. The output from the AND gate 72 is connected to a selector driver 75 which has its output connected to winding 51 of selector 49. In the preferred embodiment in which this invention is practiced the signal from selector driver 75 to winding 51 is normally at zero level and is turned on to energize winding 51. Drop data pulses from an external source such as a data processor are supplied to the second input of AND gate 72. The oscillator 70 times the drop data pulses through gate 72 to turn on selector driver 75 when ink drops 44 are in position to be deflected horizontally for removal from the jet stream. Timing pulses from oscillator 70 applied to AND gate 73 are used to time the scanning pulses from raster generator 76 applied to winding 56 of deflector 54. In the preferred embodiment of this invention, raster scan generator 76 when turned on, applies a d-c bias level signal to winding 56 on which a linear sawtooth ramp signal is superimposed.

The timing signals from oscillator 70 applied to motor drive circuit 74 are used as the basic timing for acceleration/deceleration and uniform velocity movement of stepper motor 29. Various motor drive circuits may be used, as is well-known in the art. A specific motor drive circuit 74 is not shown to simplify the description. Suffice it to say that the oscillator timing pulses can be used to drive motor 29 in an openloop or closed-loop system as the case may be. In the latter case, i.e. the closed-loop system, the oscillator timing pulses are used to time the measurement of feedback pulses to ascertain when acceleration or deceleration is completed and to supply the basic motor driving timing pulses when the motor 29 is to be operated at uniform speed during the printing portion of motion of print head 11 across the print line. The motor drive circuit 74 also has inputs to receive the motion direction signals move left, move right and seek home, as shown in the schematic diagram.

As previously discussed, the unused drops 44 are deflected to the horizontal section of the drop collector 59 during the acceleration/deceleration portions of movement of the print head assembly to the vertical section, (i.e. in the direction of motion of the print head assembly) during the period when the print head assembly is moved by motor 29 at uniform velocity. A counter 77 counts a predetermined number of pulses from emitter 31 from the time that the print head assembly 10 is accelerated from home position on command from a move right signal from the external controls to the motor drive circuit 74. In an open-loop system of the type shown, counter 77 is set at a count condition at which it is known that motor 29 will have arrived at the predetermined speed desired for moving at a uniform velocity. Stated otherwise, the predetermined count of counters 77 emits a pulse at the completion of the predetermined number of emitter pulses 31 which indicate the completion of the acceleration portion of the movement of the print head assembly by motor 29. When this count is reached, a print head position signal on the output of counter 77 is applied to AND gate 78. The print head position signal stays up until such time as a print position pulse is applied from the external control to AND gate 78. When both print head position pulse and the print position signal are up, a gate data pulse appears from AND gate 78 to AND gate 73. Timing pulses from oscillator 70 are then applied to raster scan generator 76 to apply the d-c bias signal and begin the raster scanning of winding 76. This causes deflector 54 to raise the trajectory of ink drops 44 above the knife edge 66 of the horizontal section of the ink drop collector 59 so that print drops may become deposited on the surface of paper 19 and unused drops due to the excitation of winding 51 by selector driver 75 are deflected horizontally into the vertical section of the drop catcher 59.

At the end of the printing portion of the print line, the print position signal to AND gate 78 goes down thereby removing the gate data pulse from AND gate 73. A directional signal applied to motor drive circuit 74 decelerates motor 29, brings it to a stop and reverses direction in accordance with known methods of operation by motor drive circuit 74. With the dropping of the gate data pulse, raster scan generator 76 is turned off. Winding 56 is de-energized and ink drops from nozzle 40 are then directed to the horizontal section of ink drop collector 59 below the knife edge 66, as previously described.

Figure 6:
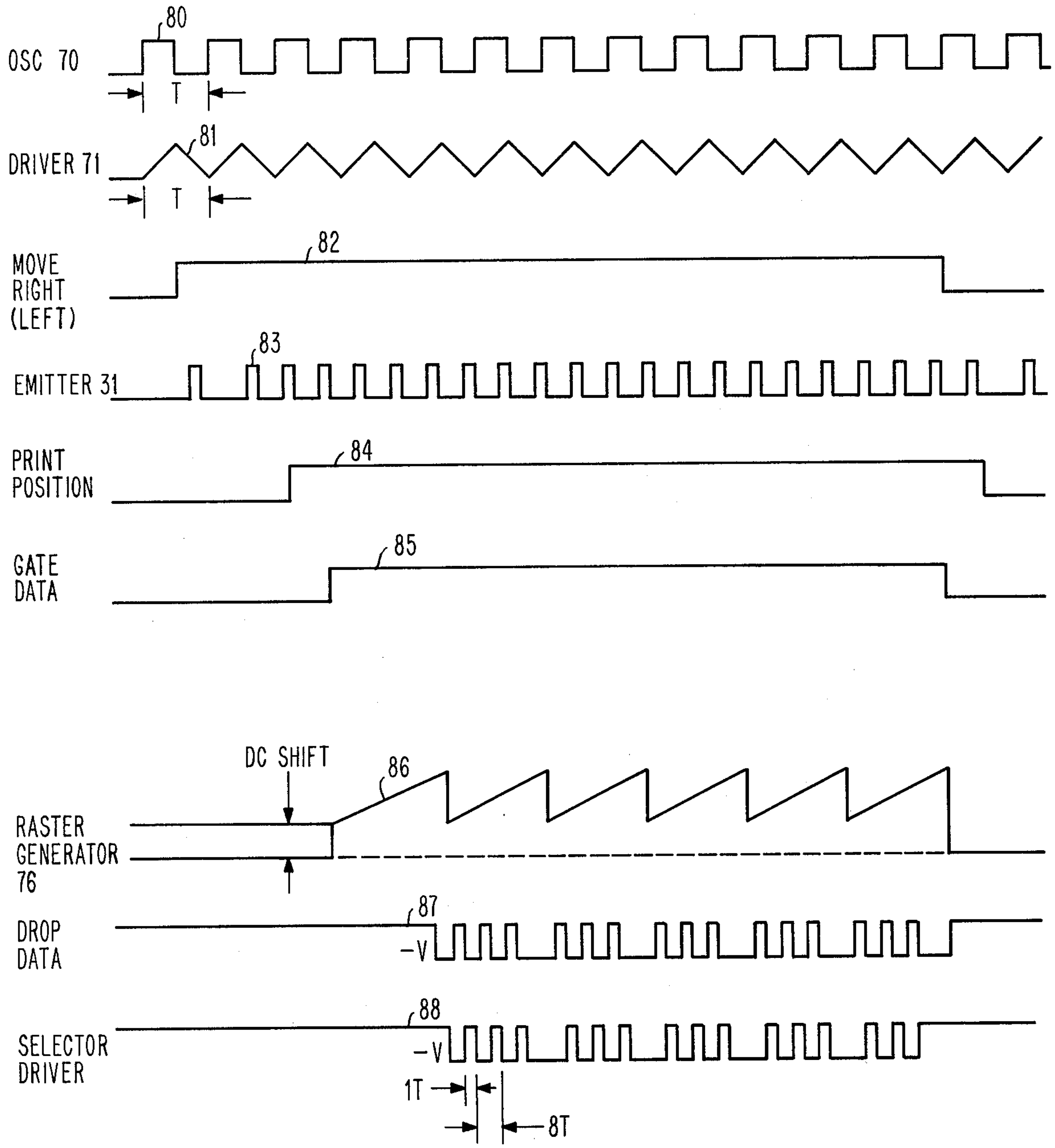
FIG. 6 is a timing chart showing the operation of the logic circuit of FIG. 5.

FIG. 6 shows the timing chart to more specifically illustrate the operation of the control system, as previously described. Curve 80 shows the timing pulses from oscillator 70. Curve 81 shows the timing pulses from excitor driver 71. When a move right or move left signal is applied to motor driver circuit, as shown by curve 82, the emitter pulses 83 begin generating to counter 77. After a predetermined number of emitter pulses, a print position pulse 84 and gate data pulse 85 activate the raster scan generator 75 to apply a d-c bias with the superimposed sawtooth ramp, as shown by curve 86. The drop data pulses 87 activate the selector driver 75, as shown by curve 88. When the move right signal 82 goes to zero, the gate data signal 85 is dropped setting off the raster scan generator signal. Upon return of the print head assembly 10 to the home position, a home position pulse from home position sensor 36 resets counter 77 in preparation for the printing of the next line of data.

While the invention has been particularly shown and described with reference to a preferred embodiment thereof, it will be understood by those skilled in the art that various changes in form and details may be made therein without departing from the spirit and scope of the invention.

We claim:

1. In an ink jet printer apparatus, the combination with a stationary print medium for receiving ink drops in the form of a line of data patterns comprising an ink jet print head movable in a continuous motion along a print line relative to said print medium, said motion having acceleration, uniform velocity and deceleration phases, said print head including means for projecting an uninterrupted stream of ink drops in the direction of said print medium, deflection means for selectively deflecting ink drops transverse to and parallel with said direction of motion, and a drop collector for preventing unused ink drops from depositing on said print medium, said drop collector having a first collector section extending transverse to and a second section extending parallel with the direction of motion of said print head, and control means for operating said deflection means to deflect unused drops toward said first collector section for interception thereby during said uniform velocity phase of motion and toward said second collector section for interception thereby during the acceleration/deceleration phases of said motion.

2. In an ink jet line printer apparatus, the combination in accordance with claim 1 in which said first collector section is a vertical section and said second collector section is a horizontal section, said uninterrupted stream is normally projected toward said horizontal section of said ink drop collector, said deflection means includes a vertical deflector, and said control means includes means for determining the acceleration phase of said motion, and means responsive to said determining means for controlling the application of a raster scan and bias signal to said vertical deflector whereby said ink drops of said stream are deflected relative to said horizontal section of said ink drop collector.

3. In an ink jet line printer apparatus, the combination in accordance with claim 2 which further comprises a drive means operable for moving said print head in said continuous motion, means connected to said drive means for generating pulses in synchronism with the motion of said drive means, and said means for determining the acceleration phase of said motion comprises a counter operable by pulses from said pulse generating means, and means operable by a signal from said counter at the end of a predetermined number of said pulses for applying said raster scan and bias signal to said vertical deflector.

4. In an ink jet line printer apparatus, the combination in accordance with claim 1 in which, said ink collector comprises a collector block having a well formed therein, and a collector plate attached to said block, and said first and second collector sections comprise vertical and horizontal flange portions formed in said collector plate extending over said well in said block.

5. In an ink jet line printer apparatus, the combination in accordance with claim 4 in which said vertical and horizontal flange portions have vertical and horizontal knife edges, respectively, said vertical and horizontal flanges having sloping surfaces for directing ink from unused drops deposited thereon away from said knife edges for collection in said well of said block.

* * * * *